United States Patent
Kappius et al.

(10) Patent No.: US 7,768,872 B2
(45) Date of Patent: Aug. 3, 2010

(54) OFFSET-AZIMUTH BINNING FOR MIGRATION AND VELOCITY ANALYSIS

(75) Inventors: Russell Aaron Kappius, Littleton, CO (US); Edward Louis Jenner, Lakewood, CO (US)

(73) Assignee: Ion Geophysical Corporation, Houston, TX (US)

( * ) Notice: Subject to any disclaimer, the term of this patent is extended or adjusted under 35 U.S.C. 154(b) by 0 days.

(21) Appl. No.: 11/066,075

(22) Filed: Feb. 25, 2005

(65) Prior Publication Data

US 2006/0018191 A1    Jan. 26, 2006

Related U.S. Application Data

(60) Provisional application No. 60/590,511, filed on Jul. 23, 2004.

(51) Int. Cl.
*G01V 1/24* (2006.01)
(52) U.S. Cl. .............................. 367/56; 367/72; 367/73
(58) Field of Classification Search .................. 367/38, 367/56, 57, 58, 73, 72
See application file for complete search history.

(56) References Cited

U.S. PATENT DOCUMENTS

| | | | | |
|---|---|---|---|---|
| 3,746,122 A * | 7/1973 | Davis | ........................... | 367/56 |
| 3,793,620 A * | 2/1974 | Miller | ........................ | 367/56 |
| 4,476,552 A * | 10/1984 | Waters et al. | ................. | 367/56 |
| 4,933,912 A | 6/1990 | Gallagher | ..................... | 367/59 |
| 5,029,145 A * | 7/1991 | Marsden et al. | ................ | 367/56 |
| 5,150,332 A * | 9/1992 | Bale et al. | ....................... | 367/73 |
| 5,402,391 A * | 3/1995 | Cordsen | ....................... | 367/56 |
| 5,487,052 A * | 1/1996 | Cordsen | ....................... | 367/56 |
| 5,532,977 A * | 7/1996 | Thore | ........................... | 367/53 |
| 5,598,378 A * | 1/1997 | Flentge | ........................ | 367/56 |
| 5,787,051 A * | 7/1998 | Goodway et al. | ............. | 367/56 |
| 5,963,879 A | 10/1999 | Woodward et al. | ............ | 702/17 |
| 6,026,058 A * | 2/2000 | Thomas | ........................ | 367/56 |
| 6,026,059 A | 2/2000 | Starr | ........................... | 367/72 |
| 6,028,822 A * | 2/2000 | Lansley et al. | ................ | 367/62 |
| 6,075,752 A * | 6/2000 | de Bazelaire | ................ | 367/59 |
| 6,131,070 A * | 10/2000 | Ferber | ......................... | 702/14 |
| 6,182,014 B1 * | 1/2001 | Kenyon et al. | ................ | 702/14 |
| 6,625,543 B1 | 9/2003 | Bevc et al. | .................... | 702/14 |
| 6,980,482 B2 * | 12/2005 | Faichney et al. | .............. | 367/73 |
| 2004/0022127 A1 * | 2/2004 | Faichney et al. | .............. | 367/73 |
| 2005/0143923 A1 * | 6/2005 | Keers et al. | ................... | 702/14 |

* cited by examiner

*Primary Examiner*—Scott A Hughes
(74) *Attorney, Agent, or Firm*—Cantor Colburn LLP

(57) ABSTRACT

The present invention comprises a method of choosing a cell structure for seismic gathers dictating a grid of azimuth-offset bins that can be of various shapes and sizes. Processes that use offset-azimuth information are optimized to operate on these cells of azimuth-offset bins and invert for seismic properties. The method provides for acquisition of 3D seismic data, selecting a seismic gather bin for sorting the data, selecting at least one cell structure for the gather that may or may not be space filling, and sorting the data in to the cell structure of the gather bin. The cell structures may be any shape including hexagonal, and may be of variable sizes and may overlap.

25 Claims, 14 Drawing Sheets

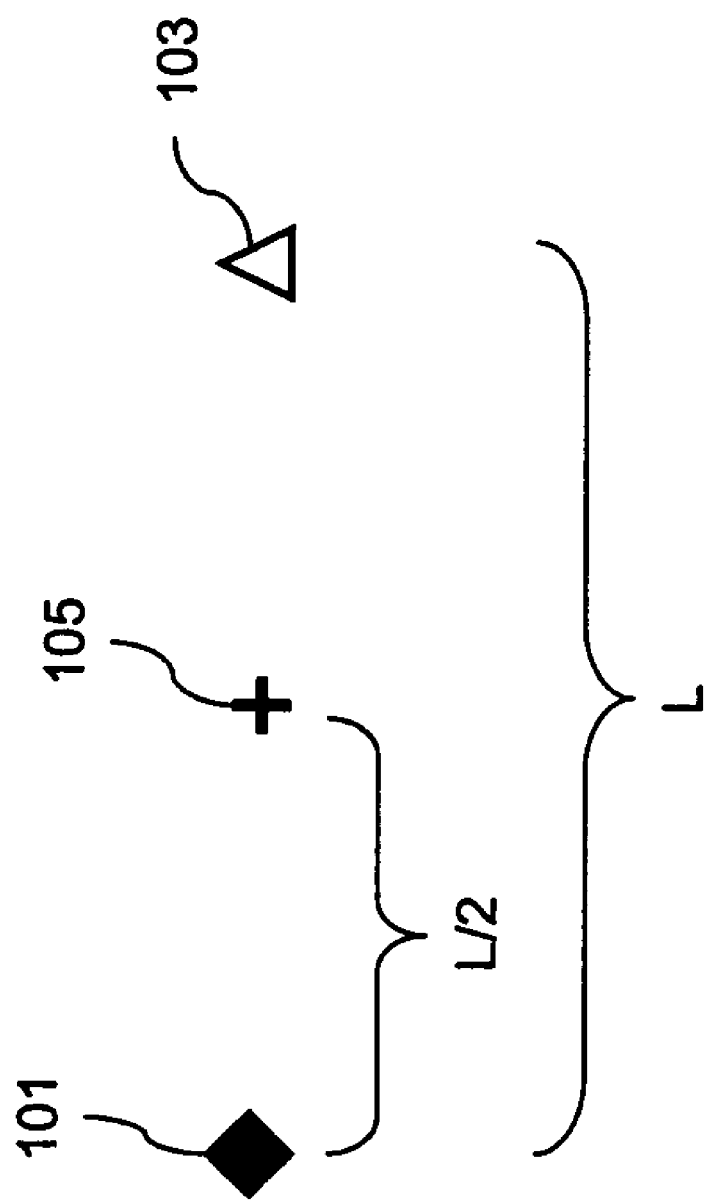

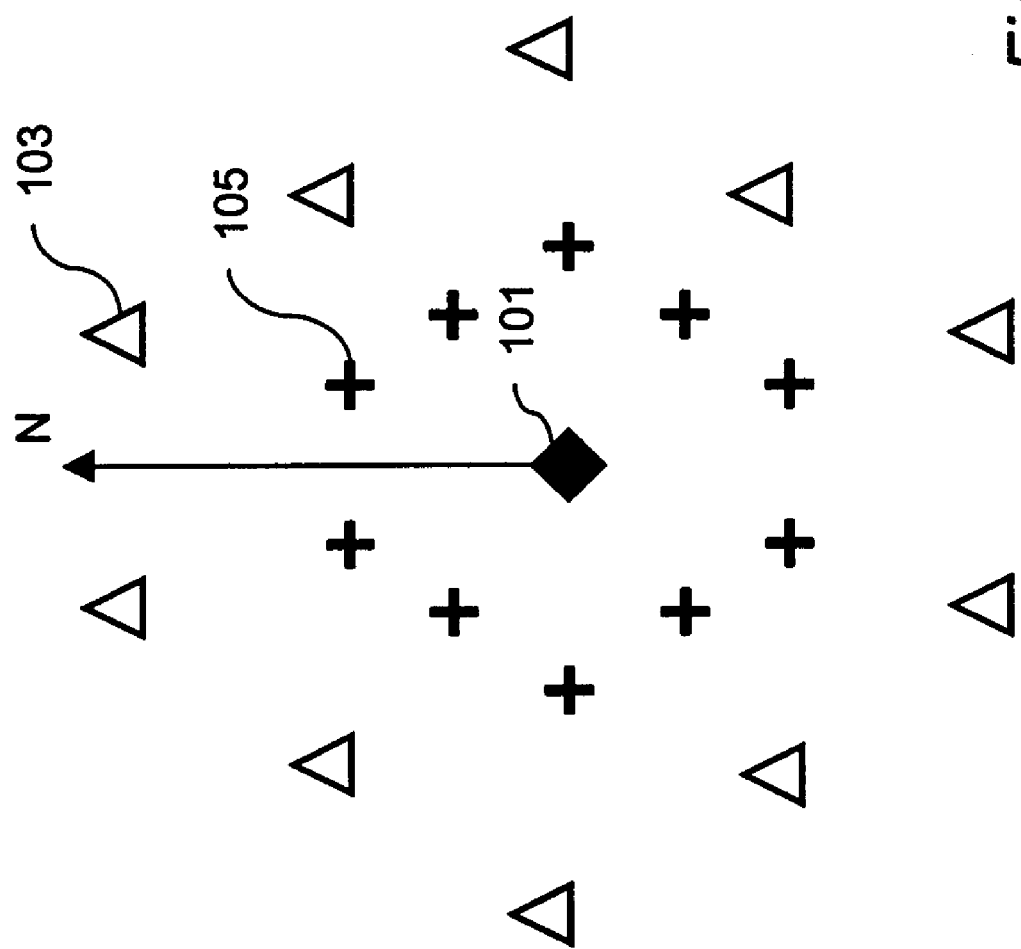

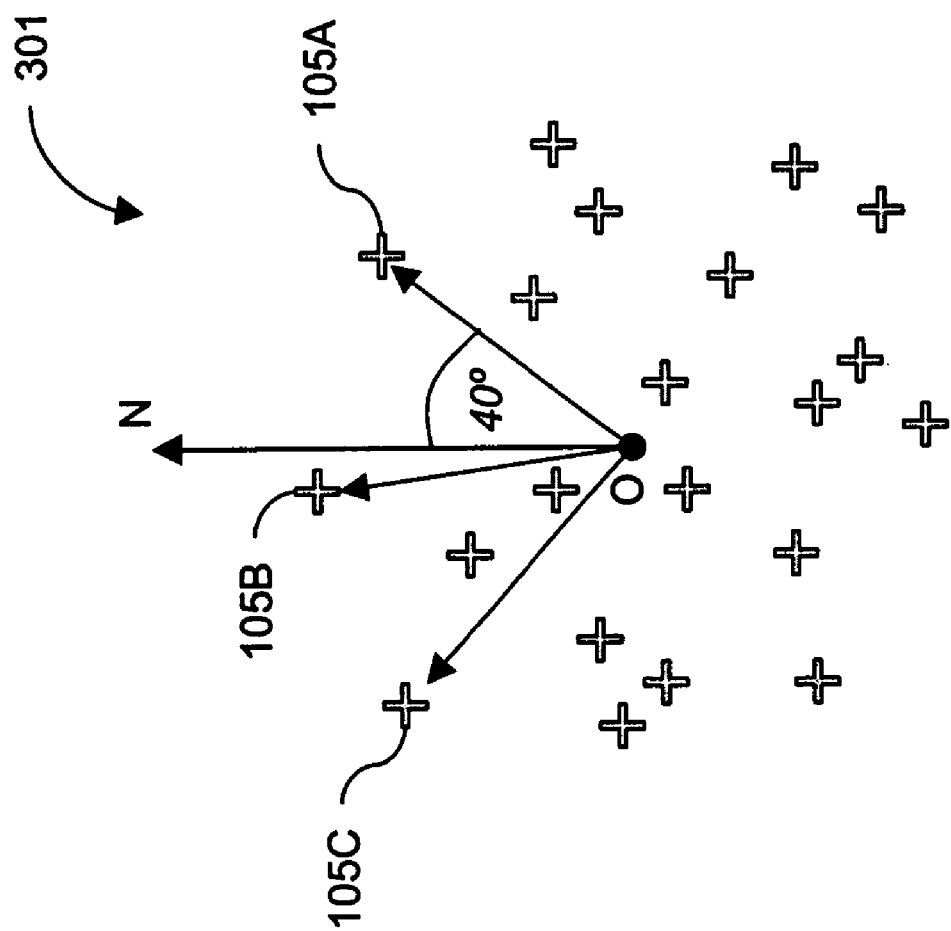

OFFSET-AZIMUTH BINNING FOR MIGRATION AND VELOCITY ANALYSIS

CROSS REFERENCES TO RELATED APPLICATIONS

This application claims priority from U.S. Provisional Patent Application No. 60/590,511 filed on Jul. 23, 2004.

FIELD OF THE INVENTION

The invention relates generally to the field of the 3D seismic data acquisition. More specifically, the present invention relates to a method and apparatus to provide for efficiently and advantageously sorting and analyzing data for three dimensional (3D) seismic arrays of sources and receivers.

BACKGROUND OF THE INVENTION

In 3D seismic prospecting, an areal array of seismic sources and receivers are positioned over an area of the earth's surface and seismic data are collected in the form of seismic traces generated by the receivers in response to acoustic waves. This is in contrast to two dimensional seismic prospecting wherein a linear array rather than an areal array of sources and receivers is utilized. In 3D as well as in two dimensional seismic prospecting it is desirable to "stack" a number of traces (commonly called a common midpoint bin or gather) which correspond to a number of source-receiver pairs which share a common midpoint position.

FIG. 1A illustrates a midpoint 105 positioned between a seismic source 101 and a seismic receiver 103. For any seismic source 101 with a receiver 103 there is a midpoint 105 that is the seismic survey position where the received signal data will be positioned for data processing purposes. For compressional seismic wave processing the midpoints are positioned a distance L/2 in the source to receiver direction for a source to receiver offset distance of L. Other waveforms or seismic acquisition and processing considerations may dictate 'midpoints' at varying locations, so the midpoints for the purposes of disclosure are for illustrative purposes.

In planning, collecting and processing a 3D seismic data, it is desirable to position the sources and receivers to optimize various conditions with respect to fold, offset and azimuth. FIG. 1B shows the areal positions of a simple 3D acquisition geometry. A source 101 is positioned relative to seismic receivers 103 and the midpoints 105 are situated between the source 101 and receivers 103. The midpoints 105 are where the data traces are positioned relative to all the data traces of the survey for purpose of binning the data traces. FIG. 1B illustrates a four-sensor receiver array. In modern practice, receiver arrays consist of hundreds or thousand of receivers. Receiver arrays are referred to as "swaths" or "patches." FIG. 1 may be considered a "narrow-swath" because the azimuthal variation of source to receivers is relatively small when compared with FIG. 1C.

FIG. 1C illustrates a "wide-swath" receiver array acquisition geometry. It is termed wide-swath because the variation in acquisition of source to receiver azimuths for this geometry is much greater than illustrated in FIG. 1B. The various geometries of source to receiver layouts or patches that comprise wide or narrow swath acquisition schemes varies greatly and is well known to practitioners in the art.

As is known in the acquisition and processing art, the survey area localized within an entire seismic survey designated for the collection of common midpoint positions from multiple source-receiver pairs is termed a common midpoint "bin." The data processing steps of organizing traces in bins is termed "binning." A bin may contain many traces from source-receiver pairs. The number of traces that goes into a bin is termed the bin's fold. The common midpoint gather (CMP) used herein for purposes of an exemplary seismic data gather, although it is only one of many. Common depth point (CDP) gathers, common reflection point gathers, common image point gathers and common conversion point gathers are all examples of seismic gathers. For the CMP, the term "source-receiver pair" refers to a source position and receiver position located on opposite sides of a midpoint and spaced substantially equidistantly from the midpoint.

FIG. 2 illustrates the concept of how a midpoint bin is formed. A plurality of source-receiver pairs in a seismic survey will have midpoints that group in the same vicinity of the survey. In FIG. 2, sources 101A, 101B and 101C with their respective receivers 103A, 103B and 103C, contain midpoints that fall relatively close together, in a selected localized area, to form a midpoint bin. The midpoints that form this example midpoint bin are 105A, 105B and 105C.

Source-receivers pairs from midpoint bins are further processed by correcting statics problems and adjusting for velocity effects prior to stacking. Stacking of seismic traces corresponding to such source-receiver pairs involves summing of the traces after so as to enhance important reflection events in the traces and remove spurious noise which can obscure the reflection events. In other words, stacking enhances the signal to noise ratio.

With respect to fold, it is desirable to have an adequate fold for each common midpoint bin in order to give an acceptable signal to noise ratio in the resulting stacked trace. It may be desirable to have uniformity of fold among a maximum number of common midpoint bins for a particular areal array. This results in a more uniform signal to noise ratio for the various stacked traces and better uniformity across the survey. With such a uniform signal to noise ratio among stacked traces, variations of amplitude from trace to trace will be related to the strength of reflection events and not the difference in the number of traces being summed. This makes the seismic survey data a more accurate product.

Certain parameters which characterize a group of 3D source-receiver pairs corresponding to a particular common midpoint bin include fold, offset and azimuth. Fold refers to the number of source-receiver pairs sharing a common midpoint for which traces are stacked. For example, if there are 16 source-receiver pairs for a particular stack, there is "16 fold" for the midpoint. Offset is simply the distance between the source and receiver of a particular source-receiver pair. Azimuth is the angular orientation of the source-receiver pair. More precisely, the azimuth angle for a particular source-receiver pair is the angle defined between the line along which the source-receiver pair lies and an arbitrarily selected direction such as true east or north.

With respect to offset, it is desirable to have a variation of offsets for the source-receiver pairs corresponding to a particular common midpoint. The different offset values are utilized to derive velocity analysis corrections for the traces being stacked. Velocity analysis corrections are applied to seismic data to position reflecting events to their proper position in time. An "average stacking velocity" is derived from the velocity analysis corrections. Such a stacking velocity is used to correct for normal moveout among the traces. Maximizing the distribution of offset values serves to enhance the accuracy of the derived stacking velocity and thus also the accuracy of the resulting normal movement correction. Maximizing the distribution also serves to enhance the accuracy of Amplitude Variation with Offset (AVO) analysis which can be useful in determining rock and fluid properties.

With respect to azimuth, it desirable to have a maximum variation in azimuth angles among the source-receiver pairs corresponding to a particular common midpoint. By having many different azimuth angles, the accuracy of 3D statics solutions and velocity analysis is enhanced. Statics are corrections applied to seismic data to correct for low velocities (weathering velocities) of seismic waves encountered in unconsolidated sediments near the earth's surface.

U.S. Pat. No. 4,933,912 to Gallagher discloses a 3-D seismic prospecting method which employs an areal array of sources and receivers by which seismic traces are generated. The areal array is segregated into a plurality of shells and angularly separated sections from which a preselected number $n_1$ of source-receiver pairs are selected for a particular common midpoint. By means of the shells and sections, the source-receiver pairs so selected have associated therewith a wide range of offsets and azimuth angles for the preselected fold $n_1$. The seismic traces corresponding to the selected source-receiver pairs are summed to give a stacked trace corresponding to the common midpoint.

U.S. Pat. No. 5,963,879 to Woodward et al. discloses a method wherein three dimensional seismic survey data are acquired and processed using a hexagonal sampling grid. The seismic data are grouped into hexagonal bins defined by the hexagonal grid instead of into rectangular bins defined by a rectangular grid. Method and apparatus which bin the data, although described for square and regular hexagonal grids, are also applicable to rectangles and hexagons of any shape. Because hexagonal binning requires fewer grid points than rectangular binning, survey source or receiver interval may be increased, which may help reduce survey cost.

U.S. Pat. No. 6,026,059 describes processes for providing a data set useful for performing analysis of reflection attribute variation among traces in a window of three-dimensional seismic data, wherein the traces have a reflection point assigned thereto and wherein the traces represent recordings from shot-receiver pairs having various azimuth angles. According to one embodiment, the process comprises: assigning an offset value to a plurality of traces; fitting a substantially conical surface having a major and a minor axis to the data of the traces within the window, wherein: the major axis of the cone represents the azimuth direction having the lowest variation in the reflection attribute, and the minor axis of the cone represents the azimuth direction having the highest variation in the reflection attribute; assigning a coordinate set to the surface, wherein the coordinate set is related to a survey geometry of the data; and comparing the reflection attribute variation as a function of offset and azimuth.

U.S. Pat. No. 6,625,543 discloses a method wherein input seismic data are re-gridded to an arbitrary output grid by output-based azimuth moveout. An input seismic data set corresponding to an input grid is used to generate an equivalent output seismic data set corresponding to an output grid different from the input grid. Preferably, the output grid is divided into blocks, and each output grid block is assigned to one of a plurality of independent parallel processors. For each output trace corresponding to an output location, the contributions of plural input traces to the output trace are computed according to an azimuth moveout operator. The contributions are then summed into the output trace.

SUMMARY OF THE INVENTION

The present invention comprises a method of choosing a cell structure for seismic gathers dictating a grid of azimuth-offset bins that can be of various shapes and sizes. Processes that use offset-azimuth information are optimized to operate on these cells of azimuth-offset bins and invert for seismic properties. The method provides for acquisition of 3D seismic data, selecting a seismic gather bin for sorting the data, selecting at least one cell structure for the gather bin that may or may not be space filling, and sorting the data in to the cell structure of the gather bin. The cell structures may be any shape including hexagonal, may be of variable sizes, cells may overlap and cells may be space filling or non-space filling.

BRIEF DESCRIPTION OF THE FIGURES

The present invention and its advantages will be better understood by referring to the following detailed description and the attached drawings in which:

FIG. 1A illustrates a source, receiver and midpoint;
FIG. 1C illustrates a wide azimuth patch;
FIG. 3A illustrates Common Midpoint Gather.

While the invention will be described in connection with its preferred embodiments, it will be understood that the invention is not limited thereto. It is intended to cover all alternatives, modifications, and equivalents which may be included within the spirit and scope of the invention, as defined by the appended claims.

DETAILED DESCRIPTION OF THE INVENTION

The present invention, herein referred to as Migration Offset-Azimuth Binning (MOAB) provides for offset-azimuth binning of 3D seismic data for migration, velocity analysis, AVO or any prestack, pre or post-migration analysis. Offset-binning of traces into common midpoint bins (or other types of seismic gathers) is a well understood and widely practiced seismic processing step. Offset binning may be used to regularize seismic data for subsequent processing such as AVO analysis or as a space saving technique for data storage. In any of its uses, it is a straightforward and well understood practice.

The present invention provides a cell structure for bins of seismic data. One of the advantages is that the cell structure provided aids offset-azimuth processing for binned seismic data gathers. These cell structures may also be referred to herein as patches. The process of sorting data into groups is termed "binning." Data that are grouped together are then said to have been binned. For the present invention, as the data are binned into the seismic data gathers, they may contemporaneously be binned into a selected cell structure. The common midpoint bin (CMP) is used for illustrating a seismic gather for the purposes of this disclosure. However, it will be understood by practitioners of the art that many other seismic gathers may be used with this invention. Common depth point (CDP) gathers, common image point gathers and common conversion point gathers are all examples of gathers that may be used with this invention, and the invention is not limited to any one type of gather.

Figure 1B:
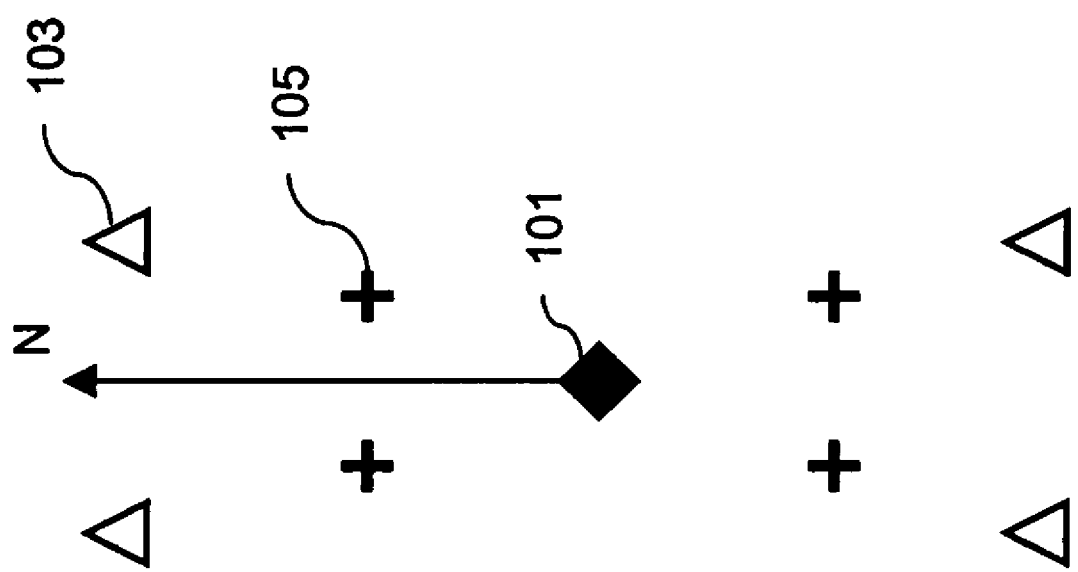
FIG. 1B illustrates a narrow azimuth swath.

Prior art methods of binning typically ignore some attribute of the data such as azimuth. Ignoring the azimuthal dependence in the data acquired using "narrow swath" geometries of FIG. 1B typically introduces little error into the dataset because there is relatively little variation due to azimuthal dependence in the data. In addition, AVO may be performed as a function of offset and source-receiver, or ray-path azimuth.

When the data are acquired with a wide azimuth patch, for example in FIG. 1C, offset binning alone can cause degradation of the data quality. This is because azimuthal data dependence may degrade seismic data traces binned and subsequently stacked together if the azimuthal dependence is not accounted for in analysis and processing.

Figure 2:
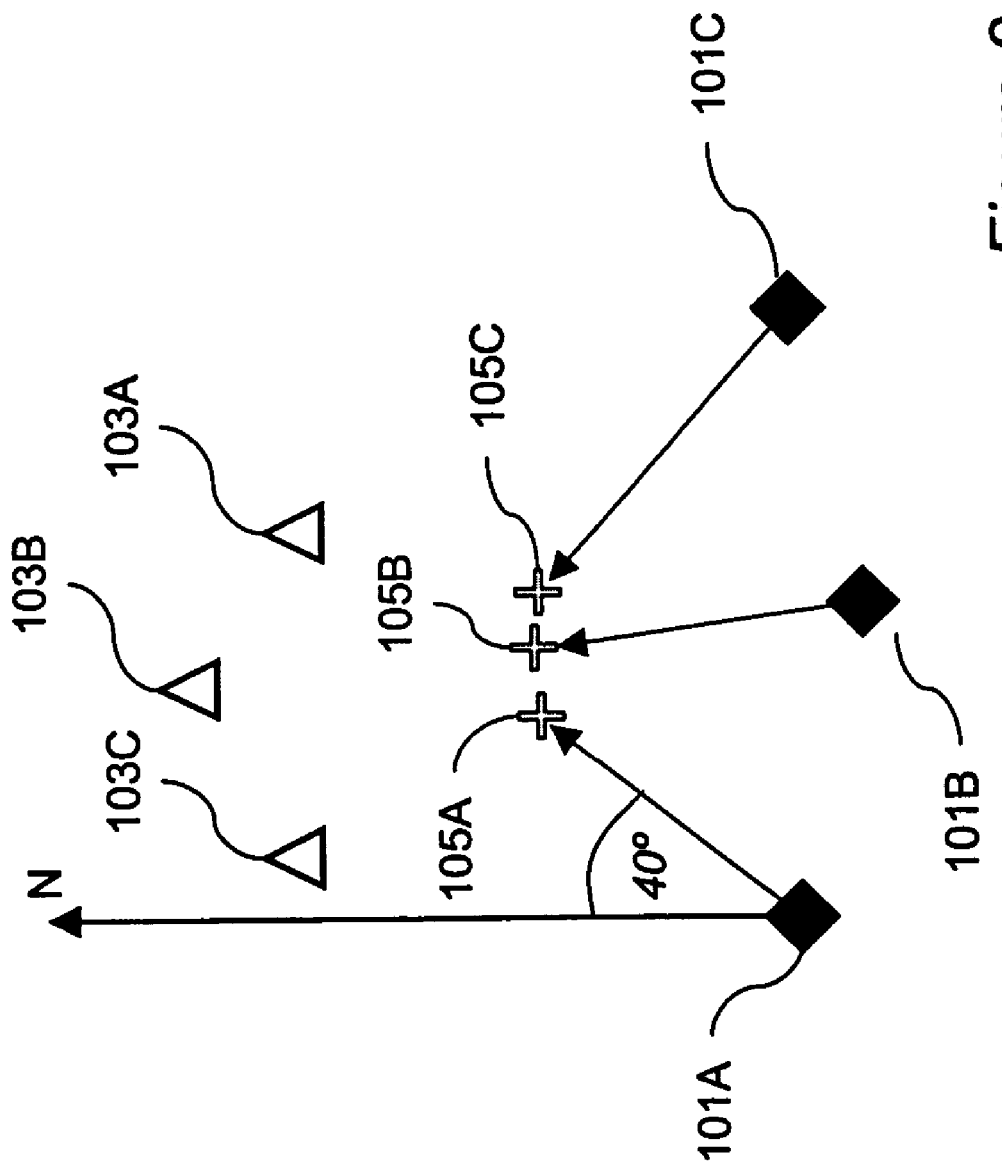
FIG. 2 illustrates a midpoint bin.

FIG. 3A illustrates a common midpoint bin 301. Three midpoints, 105A, 105B and 105C have been labeled for consistency with FIG. 2. The three midpoints illustrated in FIG. 2 are shown as a part of a 20-fold common midpoint bin gather. The data of bin 301 are shown in a position relative to the origin position, O, of bin 301. Bin 301 is repeated in subsequent figures herein with the same midpoints position relative to the origin O. The origin of bin 301 is the position of the source in every source-receiver pair of the bin, so that all source positions are collocated at the origin O of bin 301 for the purposes of this midpoint gather position display. For example, the vector from the origin O to midpoint 105A is illustrated by a vector of the same length as illustrated in FIG. 2 and has an azimuth of 40 degrees relative to North. Likewise, midpoint 105B and midpoint 105C are illustrated directionally consistent with FIG. 2, but with the sources (i.e., 103B and 103C) of each midpoint collocated at the origin O of bin 301. The vectors may be any scalar version of these. Also, the vectors may represent a source to a midpoint or a source to a receiver, or other variation of bin geometry vector relationship.

Figure 3B:
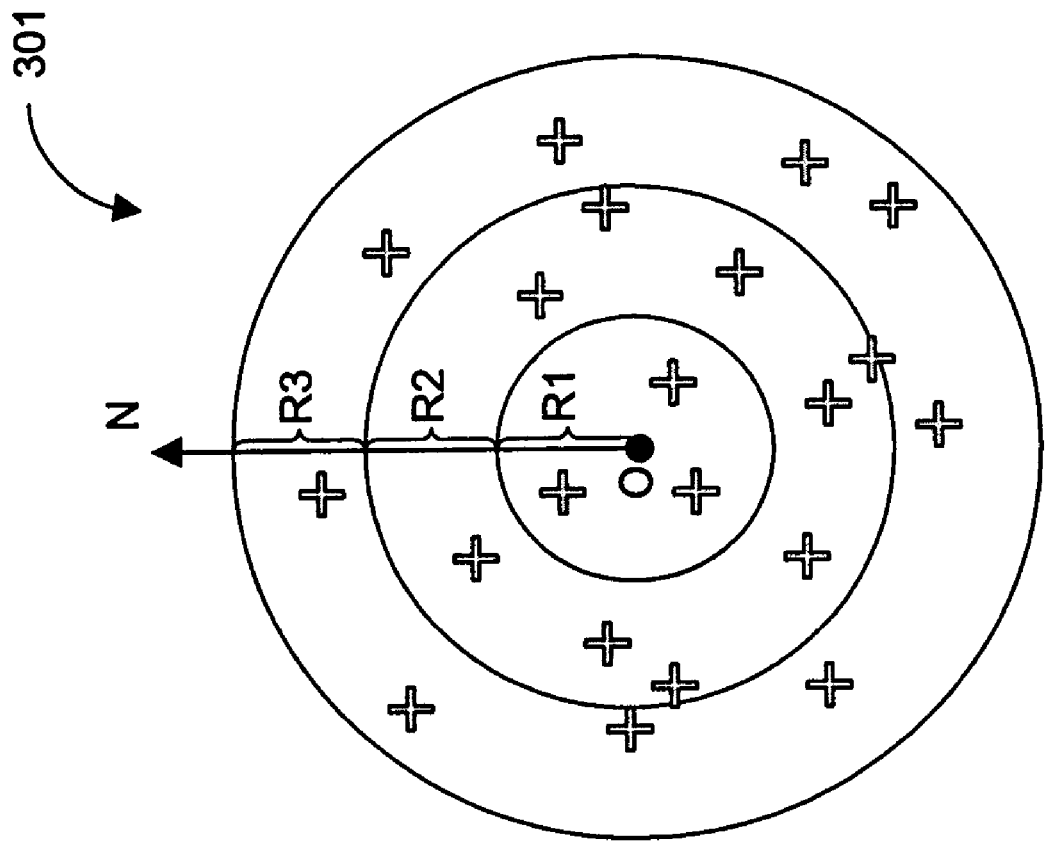
FIG. 3B illustrates offset binning.

FIG. 3B illustrates bin 301 separated into offset ranges. The midpoints are in the same positions illustrated in FIG. 3A, and are arbitrarily separated into ranges R1, R2 and R3.

Figure 3C:
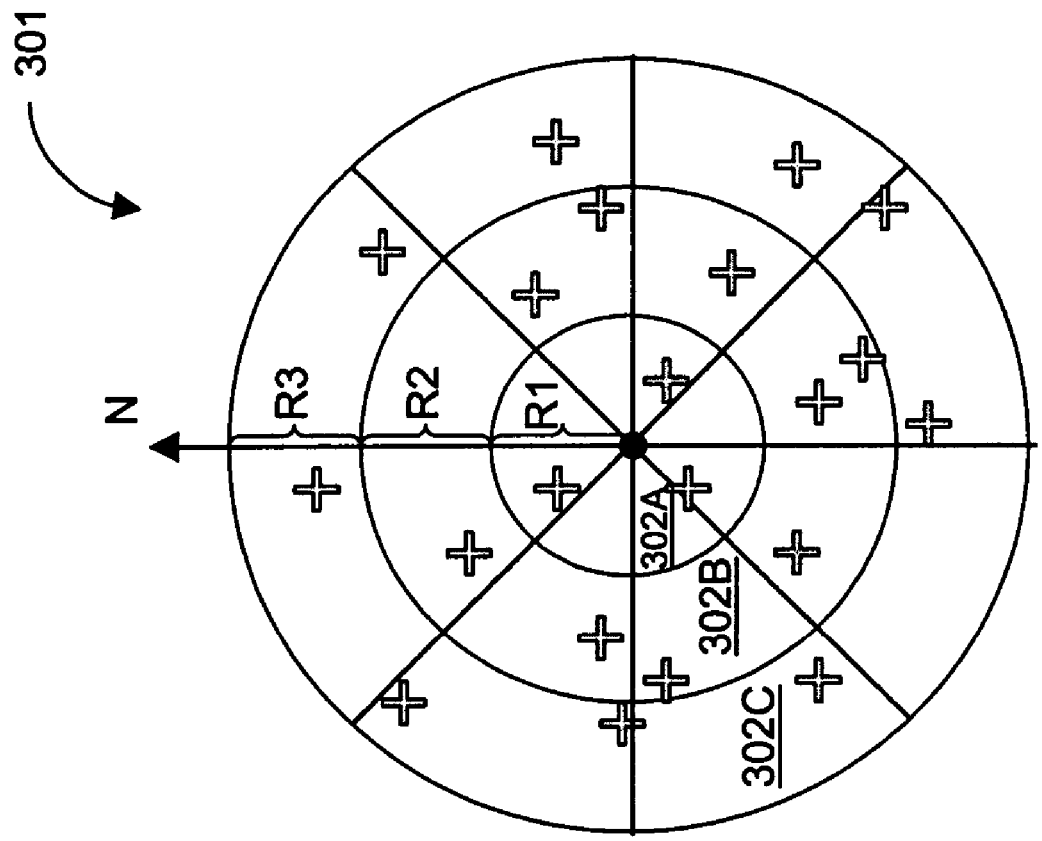
FIG. 3C illustrates a radial binning.

The present invention provides a method to offset-azimuth bin seismic data that varies from prior art practice. Prior art methods involve a radial binning scheme similar to spokes in a bicycle wheel, for example as illustrated in FIG. 3C. This typically creates an equal number of cells for some unit of source to receiver offset (for example R1, R2 and R3) that has the effect of making very small cells at near offsets, like cell 302A, and very large cells like cell 302C at far offsets, and possibly with intermediate cells like 302B. While some data acquisition geometries fit this binning fairly well, most do not. Additionally this typically produces 4-18 times as much output data as offset-only binned data. Comparing FIG. 3B with FIG. 3C shows three offset ranges in FIG. 3B compared with 24 cell sectors when the same area is divided into 8 sectors.

It is advantageous not to rely on a radial design. The present invention provides for binning based on the following principles: 1) The acquisition geometry for a given survey is known and dictates a grid of azimuth-offset bins that can be of various shapes and sizes; 2) Processes that use offset-azimuth based information can be (and are) optimized to operate on a number of bins with about the same count as offset-only binning and can successfully account for, and invert for, azimuthal seismic properties.

Figure 4:
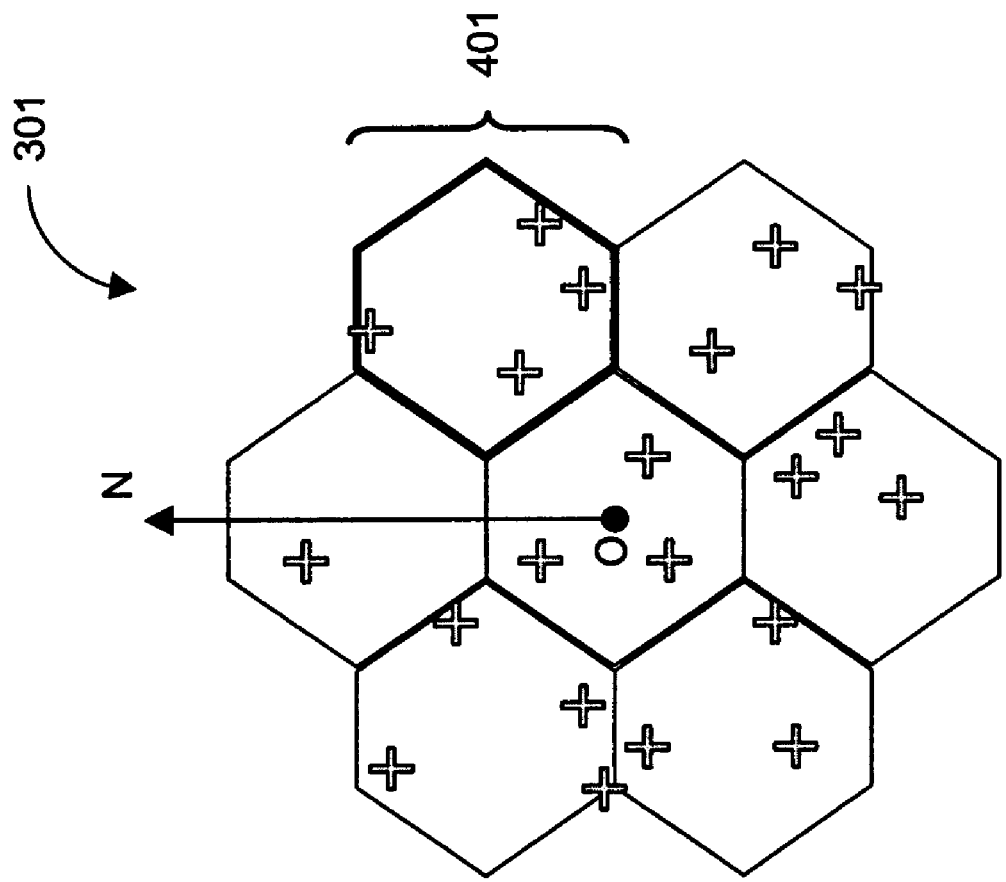
FIG. 4 illustrates hexagonal binning.

FIG. 4 illustrates an example of the binning method provided by the present invention that, in this case, is space filling. Space filling means that area defined by the bin contains cells that will encompass any midpoints assigned to the midpoint bin, and may substantially fill the entire seismic survey area. The cells illustrated in FIG. 4 are hexagonal 401, but the cells could be square, rectangular, circular, etc. This method samples the offset-azimuth plane better than the offset binning method alone. The method can be parameterized to generate any number of cells, and can be effectively parameterized to generate a similar number of cells to offset-binning alone whilst retaining sufficient or superior offset and azimuth information. Comparing FIG. 4 to FIG. 3C, FIG. 4 illustrates that 7 cells 401 encompass all 20 midpoints that 24 cells encompass in FIG. 3C.

Most prior art methods will over-sample near offsets and under-sample far offsets. These methods also generate 4-18 times as much data as offset-only binning. Prior art methods were often little more than simply multiple runs of offset-only processes for independent azimuths.

Properties of this binning are affected by algorithmic needs and acquisition geometry. Salient properties of MOAB: 1) Bins may be arbitrary in size, shape, and number. 2) Bins may or may not be space-filling. This means that some input data may be discarded in some binning schemes. Additionally, bins may overlap and some input data may be used in multiple bins. 3) Most seismic data processing algorithms based on offset only assumptions will not operate on MOAB binned data. 4) MOAB binning is appropriate for processes that need offset-azimuth preservation of input and/or output data.

Figure 5:
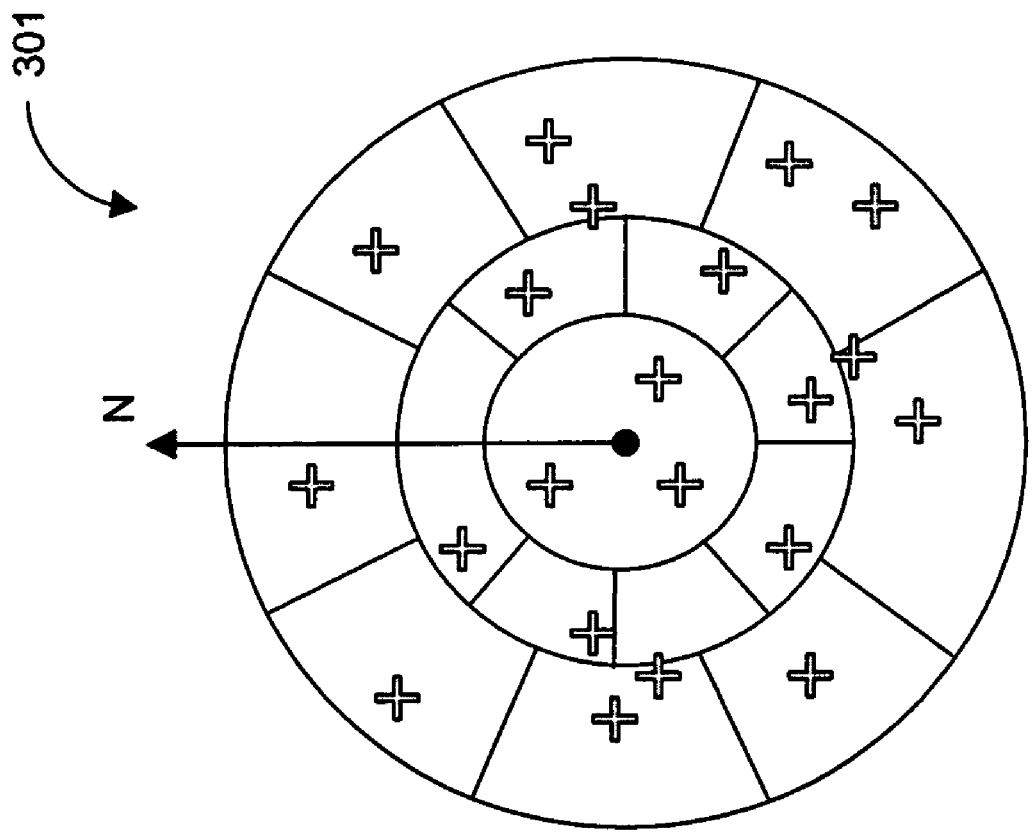
FIG. 5 illustrates radial bins with variable sectoring.

FIG. 5 illustrates radial bin cells with variable sectoring. This scheme contains concentric rings which may or may not be subdivided into azimuth sectors. Each ring can be of variable width and number of sectors. Sectoring is not mandatory (for example, small offsets (or small offset ranges) may be binned into one azimuth-independent bin, such as the FIG. 5 interior cell). Any number of rings with any number of sectors per ring is permitted. This scheme may be space-filling to maximum offset of largest ring, or alternatively, may by be non-space filling.

Figure 6:
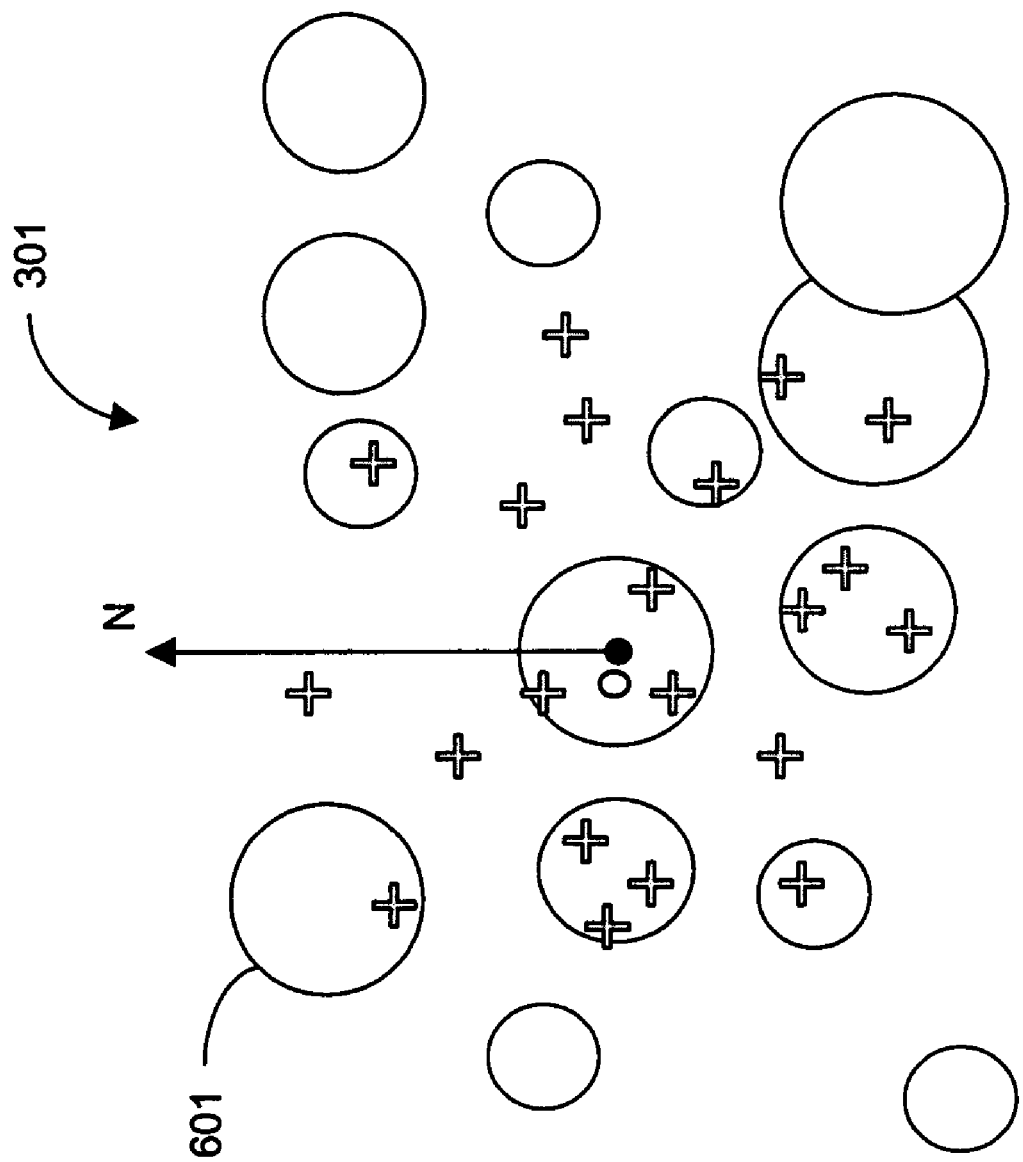
FIG. 6 illustrates Variable Circular Patches binning that consists of multiple circular offset-azimuth sample bins with variable area.

FIG. 6 illustrates cells called 'Variable Circular Patches' that utilizes binning that consists of multiple circular offset-azimuth sample cells 601 that may vary in area. This binning method may not be space-filling. The cells may or may not overlap. Data that does not fall within any cell may be discarded. Cell placement and size may or may not be variable from subsurface location to subsurface location (Common Depth Point bin location). Cell placement and size may or may not be dictated by seismic acquisition geometry.

Figure 7:
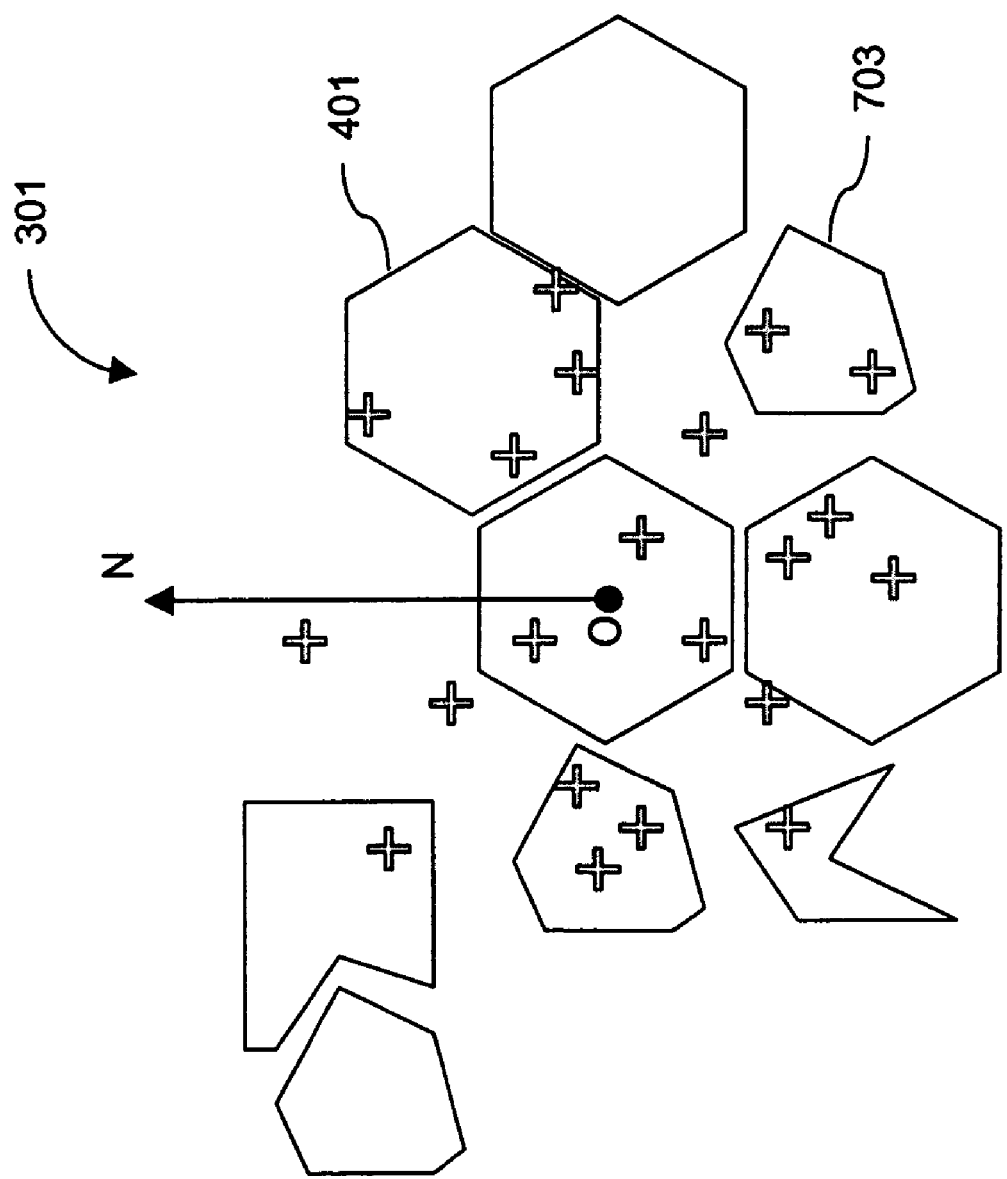
FIG. 7 illustrates Polygonal Patch binning that comprises any number of arbitrary polygons of varying size and shape.

FIG. 7 illustrates Polygonal Patch binning that comprises any number of arbitrary polygon cells of varying size and shape for the seismic data gather bin. The polygon cells may be hexagons 401 or any arbitrary shape, for example 703. The method may or may not be space filling. The number and shape of the cells or patches may be related to acquisition geometry. The number and shape of cells may vary from midpoint bin to midpoint bin. Any type of space filling tessellation using polygonal cells may be included, including but not limited to, triangles, hexagons, rectangles, Penrose tiling, etc.

The method of the present invention provides for efficient data processing, including prestack migration, by allowing for preservation of both azimuth and offset for data processing sequences, e.g. post migration azimuthal velocity analysis. Large numbers of poorly populated cells within gather bins can be avoided. With the method an azimuthal prestack time migration may be applied to seismic data and then the azimuthal field may be smoothed. The smoothed field may then be removed and a new azimuthal velocity analysis performed prior to re-migration. The processing may then be iterated if needed. However, the invention is not limited to prestack time migration and can be applied pre-migration or after prestack depth migration.

The invention provides for cell selection for seismic data gather bins as a function of acquisition geometry and processing procedures. Seismic acquisition is commonly designed for large azimuth and offset variation of data. While obtaining large azimuth variation can be difficult in marine environments due to hardware restraints (e.g. towed cable array-width), the present invention is still applicable. Land seismic surveys are often specifically designed to acquire a large offset range of source to receivers with full azimuthal extent. Variation that accompanies offset-azimuth coverage between spatial bins can be used to optimize the cell structure selection to minimize the number of cells (which can decrease computation costs) while maximizing offset-azimuth sampling.

For example, the cell selection can be designed based on input gather bins that are analyzed for offset-azimuth sampling. Cell selection may be modified to be non-spatially variant or slowly varying. Additionally cell selection may be based on a gather bin attribute best fit to acquisition geometry (for example a "lowest common denominator" data property of the gather).

Additionally, the cell selection can be driven by the processing sequence that follows the cell selection. For example, determining azimuthal velocities for a bin gather requires 3 samples in the offset-azimuth plane for inversion of parameters (fast velocity, slow velocity, azimuth of fast velocity). Typically a linear inversion can be run on the offset-azimuth binned data, and while 3 points is sufficient for inversion, a larger number of samples lead to a more stable inversion. So, if cell selection is to precede azimuthal velocity analysis, a larger number than 3, for example 7 (in the case of FIG. 4) or 16, to insure a stable inversion for 3 parameters. The requirements of subsequent processing influence the selection of the cells.

Figure 8:
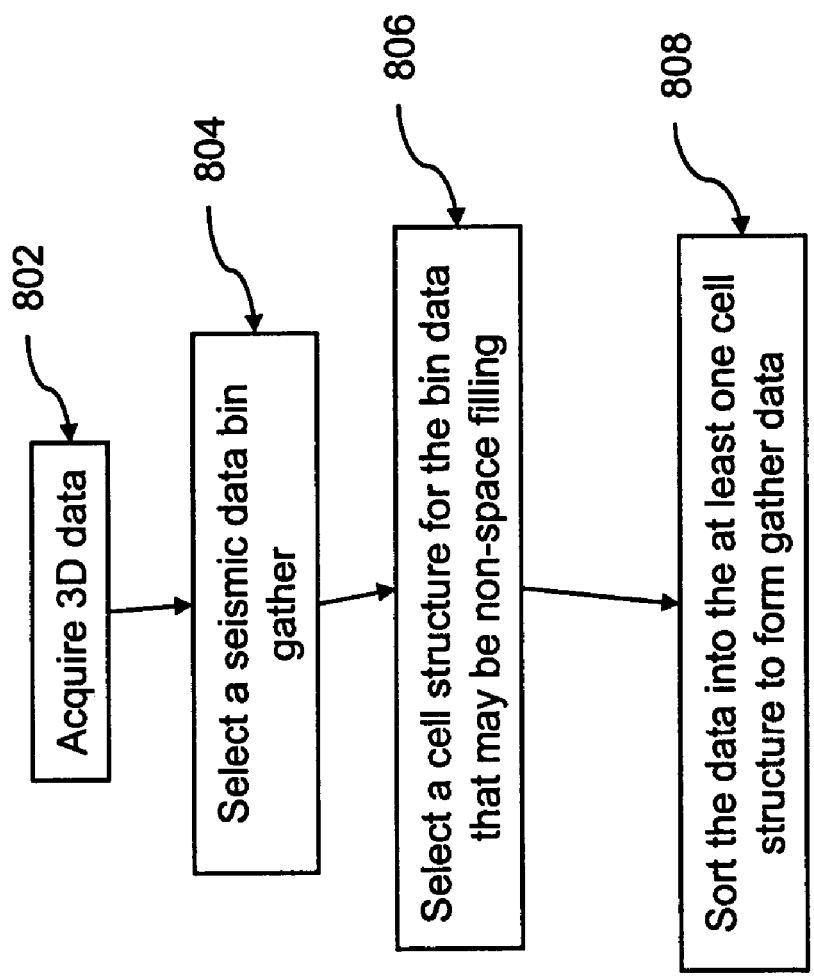
FIG. 8 illustrates a flow chart of an embodiment of the present invention.

FIG. 8 is a flow chart illustrating the method of the invention. Seismic data from a 3D survey 802 is acquired, a seismic data binning scheme is selected 804; a cell structure for the bin data is selected 806, which cells may be space-filling or not; and the data are sorted into at least one cell structure to form gather data 808.

Figure 9:
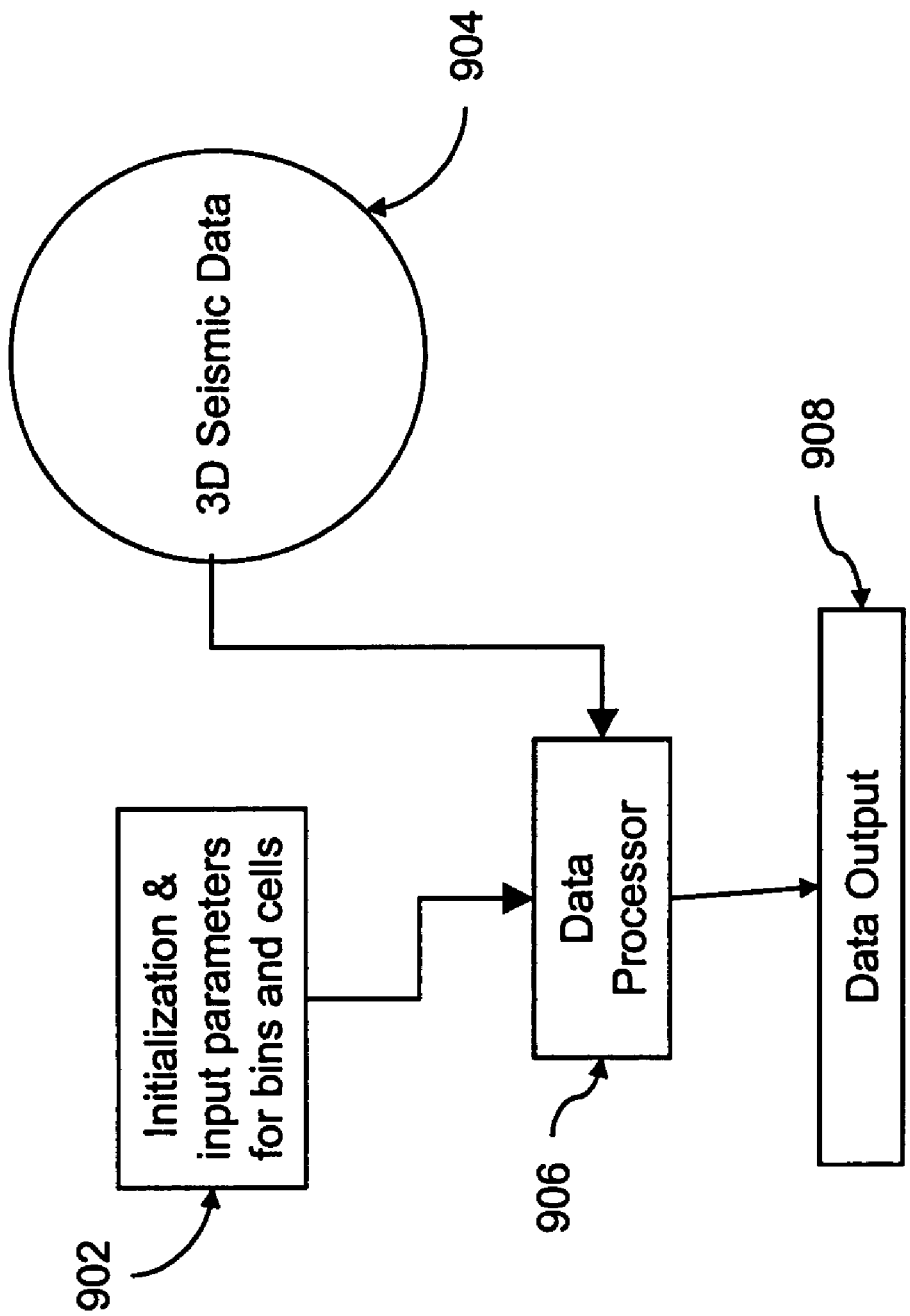
FIG. 9 illustrates schematically a system provided for the present invention.

FIG. 9 illustrates schematically a system and apparatus provided for the present invention. Initialization and input parameters (e.g. bins and cell structures) are chosen for entry 902 to the data processor 906. Data from 3D seismic surveys or systems are acquired or prepared for entry 904 to the data processor 906. The data processor 906 may put out data 908 for storage, further processing or display.

Figure 10:
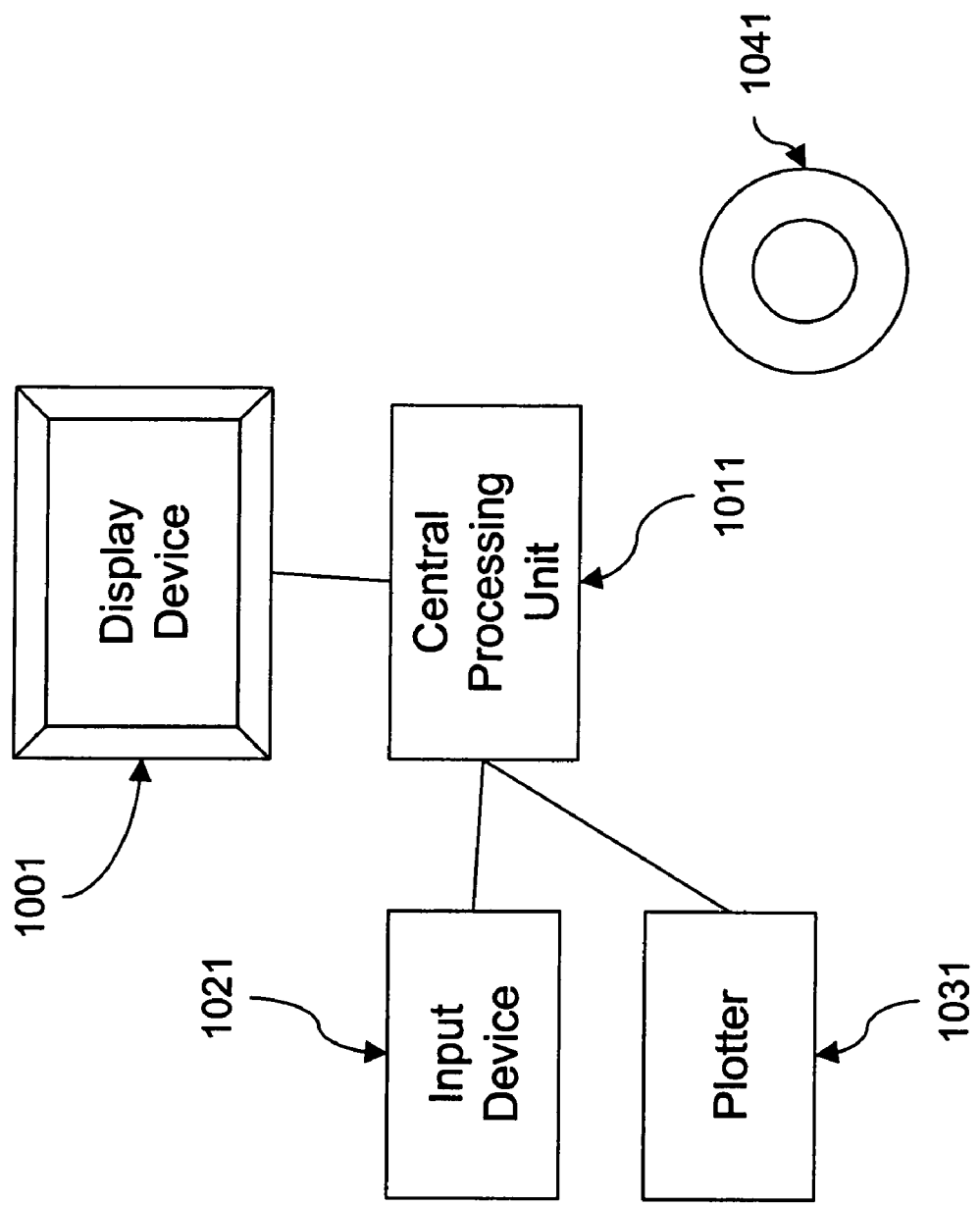
FIG. 10 illustrates an embodiment of the present invention.

The method, apparatus and system of the present invention disclosed herein may be conveniently carried out by writing a computer program to carry out the steps described herein on a work station as illustrated in FIG. 10 or other conventional digital computer system of a type normally used in the industry. The generation of such a program may be performed by those of ordinary skill in the art based on the processes described herein. FIG. 10 illustrates a computer system comprising a central processing unit 1011, a display 1001, an input device 1021, (which devices are known for example, a mouse, keyboard, files, etc.) and a plotter 1031. The computer program for carrying out the invention will normally reside on a storage media (not shown) associated with the central processing unit. The computer program may be transported on a CD-ROM or other storage media shown symbolically as storage medium 1041.

The present invention described herein is well adapted to carry out the objects and attain the ends and advantages mentioned, as well as others inherent therein. While various embodiments of the invention have been given for purposes of disclosure, numerous changes exist in the details of procedures for accomplishing the desired results. Various modifications will be apparent to those skilled in the art. It is intended that all variations within the scope and spirit of the appended claims be embraced by the foregoing disclosure.

What is claimed is:

1. A method for processing seismic data, the method comprising:
   acquiring 3D seismic data at a receiver;
   using a processor to:
      select a gather bin containing a plurality of cells having a plurality of cell structures;
      sort the seismic data into the plurality of cells to form gather data;
      perform offset-azimuth processing on the gather data as sorted into the plurality of cells having the plurality of cell structures to estimate a seismic property; and
      store the estimated seismic property to a suitable storage medium.

2. The method of claim 1, wherein the plurality of cell structures is characterized by cells that vary in at least one of i) shape and ii) size.

3. The method of claim 1, wherein the plurality of cells does not encompass every midpoint assigned to a midpoint bin.

4. The method of claim 1, wherein the plurality of cell structures includes at least one of:
   i) hexagonal cells, ii) rectangular cells, iii) circular cells, iv) arbitrarily shaped cells, and v) polygonal patches.

5. The method of claim 1, wherein the plurality of cell structures is selected from the group consisting of:
   i) concentric rings varying in width, ii) concentric rings having a varying number of sectors, iii) circular patches of varying area, and iv) polygonal patches of varying area, v) polygonal patches of varying shape, and vi) polygonal patches of varying area and shape.

6. The method of claim 1, wherein said gather bin is selected from at least one of the group consisting of: i) a common depth point gather, ii) a common reflection point gather, iii) a common conversion point gather and iv) a common image point gather.

7. The method of claim 1, wherein the plurality of cell structures is selected for a best fit of data acquisition geometry.

8. The method of claim 1, wherein the plurality of cell structures is selected for offset-azimuth analysis of the gather bin.

9. The method of claim 1, wherein the plurality of cell structures is selected to be one of: i) non-spatially variant, and ii) slowly varying.

10. The method of claim 1 wherein estimating a seismic property further comprises analyzing a migration of the gather data.

11. The method of claim 1 wherein estimating a seismic property further comprises analyzing a velocity of the gather data.

12. The method of claim 1, wherein at least one of the plurality of cells overlaps another of the plurality of cells.

13. The method of claim 1, wherein estimating the seismic property further comprises performing an inversion.

14. A method for processing seismic data, the method comprising:
    acquiring 3D seismic data at a receiver;
    using a processor to:
        select a gather bin containing a plurality of cells having a plurality of cell structures that does not encompass every midpoint assigned to a midpoint bin of the seismic data;
        sort the seismic data into the plurality of cells having the plurality of cell structures to form gather data for performing offset-azimuth processing on the gather data as sorted into the plurality of cells having the plurality of cell structures; and
        store the sorted gather data to a suitable storage medium.

15. The method of claim 14, wherein the plurality of cell structures is characterized by cells that vary in at least one of i) shape and ii) size.

16. The method of claim 14, wherein the plurality of cell structures includes at least one of:
    i) hexagonal cells, ii) rectangular cells, iii) circular cells, iv) arbitrarily shaped cells, and v) polygonal patches.

17. The method of claim 14, wherein the plurality of cell structures is selected from the group consisting of:
    i) concentric rings varying in width, ii) concentric rings having a varying number of sectors, iii) circular patches of varying area, and iv) polygonal patches of varying area, v) polygonal patches of varying shape, and vi) polygonal patches of varying area and shape.

18. The method of claim 14, wherein said gather bin is selected from at least one of the group consisting of: i) a common depth point gather, ii) a common reflection point gather, iii) a common conversion point gather and iv) a common image point gather.

19. The method of claim 14, wherein the plurality of cell structures is selected for a best fit of data acquisition geometry.

20. A system for processing seismic data comprising:
    (a) 3D seismic data;
    (b) an input device;
    (c) a data processor configured to:
        select a gather bin containing a plurality of cells having a plurality of cell structures;
        sort the seismic data into the plurality of cells to form gather data;
        perform offset azimuth processing on the gather data as sorted into the plurality of cells having the plurality of cell structures to estimate a seismic property; and
        store the estimated seismic property to a suitable storage medium.

21. The system of claim 20 wherein the at least one cell structure comprises hexagonal cells.

22. The system of claim 20 wherein the at least one cell structure is not space-filling.

23. The system of claim 20 wherein the at least one cell structure is selected from the group consisting of:
    i) rectangular cells, ii) circular cells, iii) arbitrarily shaped cells, and iv) polygonal patches.

24. The system of claim 20 wherein the at least one cell structure is selected from the group consisting of:
    i) radially varying cells with variable width, ii) variable circular patches, and iii) polygonal patches of variable area.

25. The system of claim 20 wherein said gather bin is selected from at least one of the group consisting of:
    i) a common depth point gather, ii) a common midpoint gather, iii) a common reflection point gather, iv) a common conversion point gather and v) a common image point gather.

* * * * *